Nov. 15, 1938.  P. RINKEL  2,136,995
SEXTANT
Filed Aug. 17, 1936
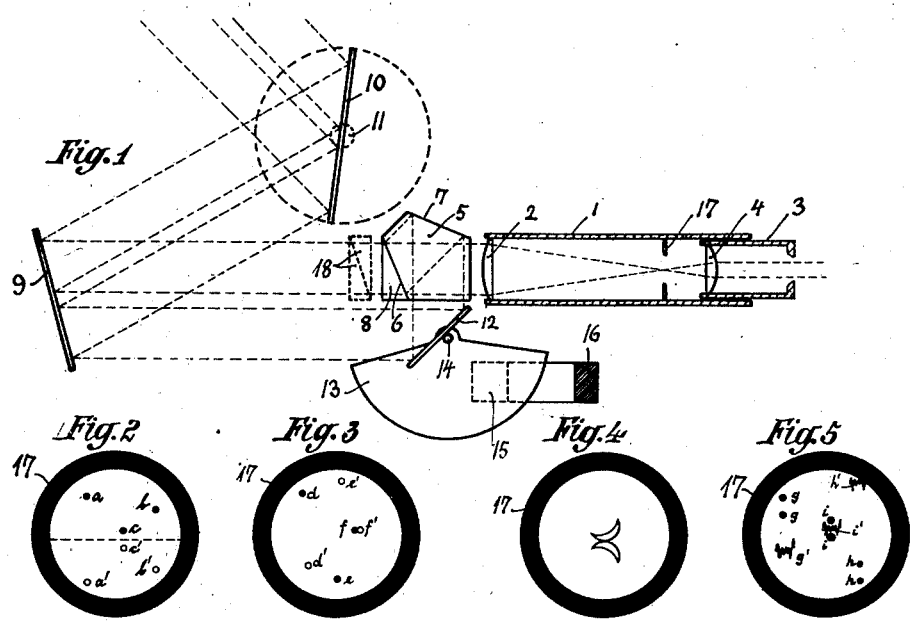
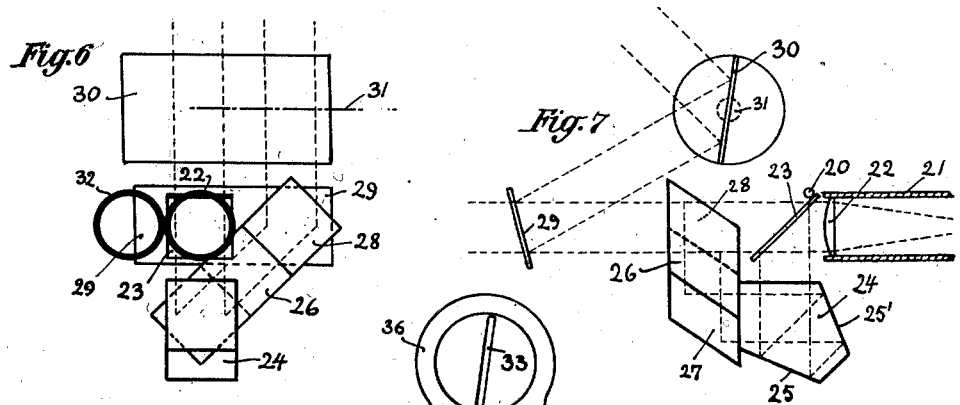
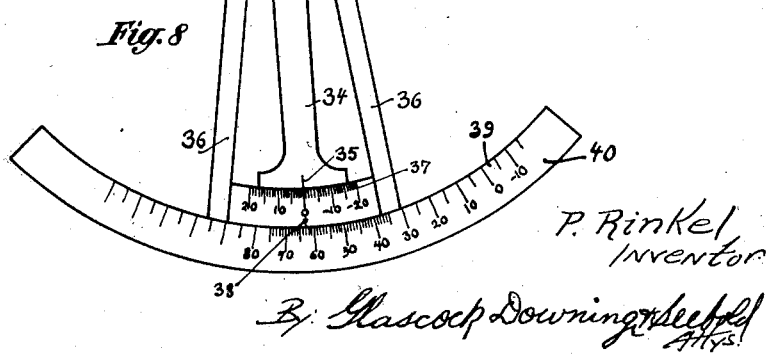
P. Rinkel, INVENTOR Patented Nov. 15, 1938

2,136,995

UNITED STATES PATENT OFFICE 2,136,995

SEXTANT

Paul Rinkel, Berlin-Charlottenburg, Germany

Application August 17, 1936, Serial No. 96,506
In Germany July 6, 1935

3 Claims. (Cl. 88—2.7)

This invention consists of an improved sextant in which the setting can be particularly easily and reliably effected even from an unsteady position such as on aircraft or ships.

The sextant in all its forms has an artificial horizon device which consists of a reflecting surface which adjusts itself independently of the manner in which the instrument is held. The mirror surface may be a level surface located externally of the instrument, for example, may be a liquid mirror. It may, also, be connected with the instrument either as a liquid mirror or a mirror (swinging mirror) rigid in itself and floating and/or rotatable in bearings (suspended mirror) which may also be inclined in relation to the horizon.

Various embodiments of the invention are illustrated by way of example in the accompanying drawing.

In the drawing:

Fig. 1 is a diagrammatic view in side elevation and partly in section illustrating one arrangement of the optical elements of the sextant.

Figs. 2, 3, 4 and 5 illustrate the field of vision bounded by the shutter of Fig. 1.

Figs. 6 and 7 diagrammatically illustrate another form of the sextant wherein Fig. 7 is a side elevational view partly in section and Fig. 6 is a cross-sectional view of the elements shown in Fig. 7.

Fig. 8 is a diagrammatic elevational view of a scale arrangement for the sextant.

In the embodiment illustrated in Fig. 1, 1 denotes a telescope with the objective 2, the eye piece 3 and the eye lens 4. In front of the objective 2 is located a pentagonal prism 5 with the reflecting surfaces 6 and 7. The prism 5 for the passage of the rays extending therethrough is extended by means of a prism wedge 8 to a body with parallel planes.

The reflecting surface 6 is transparently mirrored while the surface 7 is entirely mirrored.

9 is a fixed mirror, 10 a mirror rotatable about the axis as in the known arrangement of ordinary mirror sextants. The angle between the fixed mirror 9 and the rotatable mirror 10 alone determines the altitude of the star observed.

12 is a mirror arranged beneath the pentagonal prism 5. The mirror 12 is secured to the swinging member 13. 14 is the axis of the swinging system 12, 13. The member 13 serves in the example shown both as a damping disc which swings between the poles of a braking magnet 16. Other damping devices may, however, also be used.

The parallel light from the object observed passes, after reflection by the two mirrors 10 and 9 and by the plane parallel prism members 8 and 5 into the telescope, the image of the object observed being shown sharply in the geometrical plane bounded by the shutter 17. Another part of the parallel light reflected by the mirrors 10 and 9 strikes the swinging mirror 12 and after reflection in the surfaces 7 and 6 also passes to the telescope. The image of the object observed, reflected by the swinging mirror 12, is also shown sharply in the geometrical plane provided by the shutter 17. As the one image is reflected by an even number and the other by an uneven number of mirror surfaces, the one image is seen upside down and the other in erect position.

In Fig. 2 is shown how the field of vision bounded by the shutter 17 appears.

The points $a$, $b$, $c$ shown in full lines, indicate three star images visible in the field of vision. The three small circles $a'$, $b'$, $c'$ denote the reflected images of the same three stars. The dotted line is the line of symmetry of the two superposed images. On this line appear the image and the reflected images of all those points of the firmament for the altitude of which the sextant is set.

In order to obtain better observation of the relation of the image and the reflected image one of the two images may be offset slightly in relation to the other. The image then appearing in the field of vision is shown in Fig. 3. Three star images $d$, $e$, $f$ are visible. $d'$, $e'$, $f'$ denote the laterally displaced reflected star images. The sextant is set for the star $f$.

With the sun and moon, as soon as the image and the reflected image come into register, a bearing of the centre of the sun or the moon is provided. If only the upper or lower edge is visible then the upper or lower edge itself can at once be observed as shown in Fig. 4.

Moreover, provision may be made for sub-division of the one and preferably the image not reflected into two images one above the other. This result can be attained by means of a double prism or by means of a Wollaston prism 18, which is interposed if desired in front of the pentagonal prism in the path of the rays (shown in dotted lines in Fig. 1).

This procedure is convenient when the position of the observer is particularly unsteady and the star image observed is continuously oscillating or vibrating. In taking a bearing of the star the unsteady reflected moving image is permitted to swing between the steady double image. In Fig. 5 the zig-zag lines $g'$, $h'$, $i'$ denote the vibrating image, gg, hh, ii the double images of the corresponding three stars.

The angle of deflection of the pentagonal prism 5 is in the example shown 90°, the angle of inclination of the swinging mirror 45°. When this angle of inclination differs from 45° it makes no difference. The instrument should then be used in a position differing from the horizontal by the same amount in order that the line of symmetry of the image and of the reflected image comes in the centre of the field of vision.

In order to give the new sextant a stumpy form in particular in order to be able to keep the mirrors 9 and 18 small, it is preferable to arrange the paths of light for the image and the image to be reflected not in a position one above the other as shown in Fig. 1 but side by side.

In Figs. 6 and 7 is shown how this result can be attained.

In front of the objective 22 of a telescope 21 is located the mirror 23 pivoting about the axis 28. Beneath the latter is arranged the pentagonal prism 24 with the reflecting surfaces 25, 25'. In front of the prism 24 is disposed a Fresnel prism 26 with the reflecting surfaces 27 and 28. This prism 26 is arranged at an inclination in such manner that the path of the light is displaced parallel so far upwards and laterally that it lies at the same height as the path of light for the non-reflected image. The arrangement is shown in Fig. 6 in cross section.

The order of arrangement of the three optical aids, swinging mirror, pentagonal prism and Fresnel prism may be as desired.

In the embodiment shown in Figs. 6 and 7 the position of the swinging mirror and of the prism are interchanged in relation to the arrangement shown in Fig. 1. The pivoted mirror in this case consists of a transparent mirrored plane parallel plate. The surfaces 25, 25' of the pentagonal prism are entirely mirrored. 29 is the fixed mirror and 30 the mirror rotatable about the axis 31 in a known manner.

It is particularly simple to arrange the new sextant so that it can be used for taking observations with a natural horizon. In the embodiment shown in Fig. 6 the two mirrors 29 and 30 are extended for this purpose to the one side. Parallel to and adjacent the telescope 21 is located a second telescope 32. On observation through this telescope 32 the stars are observed by way of the fixed mirror 29 and of the rotatable mirror 30 and adjacent the fixed mirror 29 the natural horizon is observed. The arrangement consisting of the swinging mirror and the prism thus do not lie in the path of the rays.

In Fig. 8 is shown diagrammatically a special scale arrangement which cannot be fitted to known sextants having a swinging arc.

The index arm 34 with the index 35 is firmly connected with the rotatable mirror 33. With the rotatable system 33, 34, 35 is connected a scale carrier 36 which has a scale 37 and a pointer 38. The pointer 38, on rotation of the system 33 to 38, passes along the arc 39 on the scale carrier 40. If now the index 35 is adjusted to the zero point of the scale 37 located in the middle and the system 33 to 38 is turned as a unit about the common axis, then by means of the pointer 38 the set altitude can be read off on the scale 39. If a definite expected value is set on the scale 39 and fixed in this position and then on the observation only the arm 34 with the mirror 33 and the index 35 is moved then by means of the pointer 35 the difference between the actual and expected angle can be read off on the scale 37.

The further necessary and usual devices such as dark shades, a protecting casing for the swinging devices, vibration devices for reducing the friction of the stationary pivoting axis, tilt indicator (cross inclination levels) and verniers, are not shown.

Compared with pendulum sextants of known kind with swinging scale, the new pivoted mirror sextant possesses a number of further advantages.

Greater accuracy of readings is obtained, since finer sub-division and also additional scale devices can be used. Further, after the observation the result of the measurement is retained and can be examined again. High angle observation is not necessary, in fact sighting is always effected in an approximately horizontal direction.

As the heavy segment on a pendulum is dispensed with very much shortened periods of vibration can be obtained.

It is particularly suitable to form the damping disc serving as a pendulum weight as a pendulum having the minimum period of vibration.

The arrangement for observing the natural horizon permits control of the artificial swinging mirror horizon and inversely there can be determined whether an unreliable natural horizon can be used for a measurement. Finally the dip of the horizon can be measured by reflection of the horizon on itself.

Having described the nature of the invention and the manner in which the same is to be performed, I claim:

1. In a sextant, an index mirror for reflecting light proceeding from an object to be observed, an eye-piece arranged at one end of the sextant, a fixed mirror positioned at the other end of the sextant for reflecting the light of the index mirror in a direct path into the eye-piece so that a first image of the object may be viewed at the first end of the sextant, angularly disposed transparent reflecting means interposed in the direct path of the light reflected by the fixed mirror allowing the light forming the first image to pass therethrough, reflecting means arranged intermediate the fixed mirror and the eye-piece and positioned laterally of the direct path between the fixed mirror and the eye-piece including at least two angularly arranged complete reflecting means one for intercepting light forming a second image of the observed object proceeding from the fixed mirror and the second complete reflecting means reflecting the light forming the second image transversely with respect to the direct path of the first image onto the transparent reflecting means, said transparent reflecting means being arranged to reflect said transverse light image into said eye-piece, and one of the reflecting means intermediate of the fixed mirror and the eye-piece being swingably mounted to be moved by gravity.

2. In a sextant, an index mirror for reflecting light proceeding from an object to be observed, an eye-piece arranged at one end of the sextant, a fixed mirror positioned at the other end of the sextant for reflecting the light of the index mirror in a direct path into the eye-piece so that a first image of the object may be viewed at the first end of the sextant, a pentagonal prism interposed in the direct path of light reflected by the fixed mirror, one face of said prism having a transparent mirrored surface permitting the light forming the first image to pass therethrough, another face of the prism having a completely mirrored surface so as to reflect a transverse beam of light onto the transparent mirrored surface of the prism, said transparent mirrored surface being positioned to reflect the reflected transverse beam of light into the eye-piece, and a pendulum actuated mirror positioned laterally of the direct path of light forming the first image and arranged intermediate of the fixed mirror and the eye-piece for reflecting light forming a second image proceeding from the fixed mirror onto the completely mirrored surface of the prism whereby the second image is inverted in being reflected into the eye-piece.

3. In a sextant, an index mirror for reflecting light proceeding from an object to be observed, an eye-piece arranged at one end of the sextant, a fixed mirror positioned at the other end of the sextant for reflecting the light of the index mirror in a direct path into the eye-piece so that a first image of the object may be viewed at the first end of the sextant, a transparent swingable mirror interposed in the direct path of light forming the first image and adapted to be moved by gravity to reflect transverse beams of light into the eye-piece, a pentagonal prism arranged laterally of the direct path of light forming the first image, said prism having two mirrored surfaces and one mirrored surface being arranged to reflect light onto said transparent mirror, and prism reflecting means positioned intermediate the fixed mirror and the pentagonal prism for intercepting light from the fixed mirror and reflecting the same onto the other mirrored surface of said pentagonal prism to provide a second image of the observed object which appears inverted in the eye-piece in being reflected thereinto.

PAUL RINKEL.